(12) United States Patent
Francis (10) Patent No.: US 6,168,319 B1
(45) Date of Patent: Jan. 2, 2001

(54) SYSTEM AND METHOD FOR ALIGNING OPTICAL FIBER COLLIMATORS

(75) Inventor: Kurt R. Francis, Yuma, AZ (US)

(73) Assignee: Corning Incorporated, Corning, NY (US)

( * ) Notice: Under 35 U.S.C. 154(b), the term of this patent shall be extended for 0 days.

(21) Appl. No.: 09/368,687

(22) Filed: Aug. 5, 1999

(51) Int. Cl.$^7$ .................................................. G02B 6/36
(52) U.S. Cl. ............................ 385/79; 385/61; 385/78; 385/76; 385/60; 385/57; 385/55
(58) Field of Search ................. 385/79, 61, 78, 385/76, 77, 60, 58, 59, 57, 55

(56) References Cited

U.S. PATENT DOCUMENTS

| | | | |
|---|---|---|---|
| 4,813,756 | 3/1989 | Frenkel et al. | 350/96.18 |
| 4,958,897 | 9/1990 | Yanagawa et al. | 350/96.15 |
| 5,082,343 | 1/1992 | Coult et al. | 385/34 |
| 5,299,272 | 3/1994 | Buchin . | |
| 5,446,813 | 8/1995 | Lee et al. | 385/31 |
| 5,453,827 | 9/1995 | Lee | 356/73.1 |
| 5,539,577 | 7/1996 | Si et al. | 359/629 |
| 5,555,330 | 9/1996 | Pan et al. | 385/39 |
| 5,642,448 | 6/1997 | Pan et al. | 385/31 |
| 5,661,829 | 8/1997 | Zheng | 385/33 |
| 5,768,458 | 6/1998 | Ro et al. . | |
| 5,822,478 | 10/1998 | Kim . | |
| 5,841,591 | 11/1998 | Zhu et al. | 359/819 |

FOREIGN PATENT DOCUMENTS 0 575 993 A2   6/1993   (EP) .

OTHER PUBLICATIONS

Falciai, R. et al.; *Nd: YAG laser delivery system utilizing GRIN rod lenses as focusing–collimating optics*; Optics & Laser Technology, Dec. 1994, vol. 26; Pp409–412.

*Primary Examiner*—Frank G. Font
*Assistant Examiner*—Reginald A. Ratliff
(74) *Attorney, Agent, or Firm*—Philip G. Alden

(57) ABSTRACT

A method and apparatus of aligning a collimator assembly requiring only a single-axis adjustment and for which the collimator may be paired with any other similarly aligned collimator. A collimator typically includes a fiber grasped by a ferrule. Both the ferrule and a graded-index (GRIN) lens are eventually bonded to the inside of a glass tube with the fiber/lens distance fixed for optimum collimator performance. According to one method of practicing the invention, the tube/lens assembly is fixed, and the ferrule/fiber is slidably inserted into the tube. The position of the ferrule/fiber is adjusted within the tube while the size of the resultant beam is measured at a fixed distance from the output from the lens. If there are two such positions producing the optimum beam size, the position of less separation between the ferrule and fiber is chosen. The collimators aligned by the invention may be freely paired with each other (for example, within a sleeve or housing also containing an optical element located between the two collimators). An optimum beam size and optimum measuring distance may be established by an optical calculation or other optimization technique dictated for the intended use of the collimator.

32 Claims, 4 Drawing Sheets

SYSTEM AND METHOD FOR ALIGNING OPTICAL FIBER COLLIMATORS

BACKGROUND OF THE INVENTION

1. Field of the Invention

The present invention relates generally to optical components employing optical fibers, and in particular to fiber collimators.

2. Technical Background

Optical fiber has become increasingly important in many applications involving the transmission of light. Over long distances, single-mode silica optical fiber is used in optical communications networks to transmit large amounts of data with low loss and immunity to interference. Telecommunication fibers are usually designed to transmit only a fundamental optical mode. That is, they are single-mode at the preferred telecommunication bands near 1310 and 1550 nm, which are in the infrared portion of the spectrum.

The light transmitted through the fiber can also be subjected to different types of optical interactions to filter, modulate, split, combine, or otherwise act on the light. In most cases two or more fibers are led into an enclosure operating as an optical system. The input light entering the enclosure, usually but not always on one fiber, interacts with some optical device within the enclosure, and the resulting light exits the enclosure via one or more fibers. One example of a two-port system is an optical isolator in which two polarizers sandwiching a Faraday rotator are positioned between the two fibers which have collimating lenses adjacent their free ends. The polarization angles are set such that light can propagate in one direction through the isolator but is prevented from propagating in the opposite direction. Another example is a dielectric interference filter which transmits or reflects selected wavelengths.

In practice, the fibers used in such optical systems are typically held in collimator assemblies which are easily aligned to the enclosure of the optical system. A commercial collimator includes as its most fundamental components the fiber, a small glass tube (sometimes referred to as a capillary) which holds the exposed fiber end, and a graded-index lens (GRIN) lens. A GRIN-type lens used with optical fiber is a generally cylindrically shaped piece of optical glass with a length longer than its diameter. It is fabricated to have a radially varying index of refraction that is greater towards the center, with the result being that it produces a focusing effect similar to a convex lens. GRIN lenses are commercially available under the trade name Selfoc.® Both the fiber and the GRIN lens are inserted and held in the tube s;o that the GRIN lens collimates the light diverging from (or focuses the light to) the smaller core of the optical fiber.

Conveniently, the fiber is held in the collimator assembly by a cylindrical ferrule which closely fits inside the small glass tube. The distance between the fiber end (as determined by the ferrule position) and the GRIN lens is crucial for collimation. Once the distance has been set, the fiber and GRIN lens are fixed within the tube by epoxy, for example, so as to maintain the desired collimation. The collimator can then be inserted into the optical system with alignment provided by sleeves, for example, into which the glass tube and other optical components fit snugly. The fixed displacement between the fiber and the GRIN lens in the collimator should provide an optically well-characterized beam, and result in minimum insertion loss between the fiber and the optical system. Although for some applications the beam should preferably be collimated in the far field, in other applications there are alternate considerations. For example, the beam may be focused to a minimum spot size at a predetermined distance, or the desired beam may be characterized as having some combination of beam size and beam divergence at some predetermined distance. Such aligned collimators are often commercially available or fabricated independently of the optical system in which they are to be used.

Conventionally, the assembly and alignment of collimators have involved a long, tedious, and labor-intensive operation. In many cases, the collimators which are so aligned must be paired together for use within a dual- or multi-port optical system. The pairing imparts additional complexity to the distribution, sale, and use of collimators.

In the typical process of assembling a collimator, the GRIN lens is bonded into the glass tube with its angled (or faceted) side inside the tube and it plano side facing outwardly toward the intermediate optical component. The fiber is received and held within the bore of the ferrule along its central axis, and the ferrule-fiber assembly is inserted into the tube (or sleeve). Thereafter, the ferrule's position (and hence the fiber's position) are varied or adjusted along the length of the tube until some optimum condition is achieved. At that point, the ferrule is bonded to the tube.

The fabrication of an input matched-pair collimator has typically been a two-step process involving the alignment of two collimators. For example, in the first step the assembly of the tube and GRIN lens bonded to one end of the tube is held in a fixture. The ferrule-fiber assembly is fit into the other end of the tube, and a visible laser is coupled to the opposing free end of the fiber or "pigtail." The position of the ferrule-fiber assembly is varied axially along the z-direction in the tube, and the spot size for the beam exiting the GRIN lens is visually observed striking a surface of an infrared-sensitive phosphorescent card placed from 0.5 to 6 feet (15 to 100 cm) from the plano face of the GRIN lens. At the ferrule position at which the spot size is minimized, the ferrule-fiber assembly is permanently fixed within the tube. At these distances, a minimally-sized beam is focused and essentially collimated with no divergence or convergence. However, a problem with aligning at these distances is that azimuthal misalignment between the faceted faces of the ferrule and GRIN lens introduces an angular offset that results in a beam displacement at these large distances that is too large for automated equipment to easily accommodate. As a result, the alignment of the input collimator has been accomplished visually by the operator with little opportunity for simplified automation without complex measurement equipment and software routines.

It is generally felt that two collimators independently aligned according to this method are not adequately aligned to each other to allow their use in one system. As a result, it is conventional to align a second collimator using the first aligned collimator as a source. In one conventional process, an already-aligned input collimator is used to align a second matched collimator, and the two are thereafter maintained as a pair. In this process, a laser is attached to the pigtail of one collimator, and in optical intensity detector is attached to the pigtail of the second (or output) collimator. The already-aligned input collimator is mounted onto a fixture allowing tip-tilt adjustment (that is, two orthogonal angular adjustments). The bonded assembly (including the GRIN lens and the glass tube for the collimator to be matched) is held in a fixture providing two degrees of adjustment in tilt-tip angle, and an additional two degrees of freedom in the x- and y-directions perpendicular to the tube axis. A first stage holding the tube-GRIN lens assembly provides adjustability for the two tip-tilt angles and the x- and y-directions.

A second stage holding the fiber-ferrule provides the z-direction adjustment. The various stages are manually adjusted to minimize insertion loss, which is measured by observing the magnitude of the optical signal on a detector attached to one of the pigtails.

Typically, the ferrule is adjusted for maximum signal quality, and then the other five dimensions are adjusted to further increase signal quality. Whenever the z-axis adjustment is made, any angular offset from the collimator affects the spatial offset and significant adjustment of the remaining controls in the x- and y-directions is typically required. Once the performance of the matched collimator has been optimized, its ferrule is bonded to the associated glass tube, thereby fixing its separation between its fiber and GRIN lens. However, the alignment is believed to remain effective only if the two fiber pigtails and collimator assemblies used in the obtaining the matched collimation are thereafter used together. That is, they must remain paired until used in assembling the ultimate optical component, which imposes additional handling, quality-control, and transportation limitations on downstream fabrication steps, as well as doubling losses if a single collimator assembly is damaged or must be rejected in later manufacturing steps.

An alternative approach is to use a master collimator in aligning all other collimators. Any of the so aligned secondary collimators can thereafter be used together. Any input collimator which has been aligned along its z-axis by the previously described alignment process may be used as the master collimator. The master collimator is fixed to a fixture allowing tilt-tip adjustment for two degrees of adjustment. Thereafter the same procedure used in aligning the matched collimator is followed for an additional five degrees of adjustment. This produces a secondary collimator registered to the master collimator. Repeating the procedure for yet further secondary collimators produces multiple secondary collimators that match not only the master collimator but also match each other as long as the same master collimator is used to align both of the secondary collimators being paired. Nonetheless, this one-step procedure suffers in commercial practice due to the tedious seven-axis adjustment for each secondary collimator being produced.

A better alignment procedure is desired, particularly one that does not require the adjustment of a large number of alignment parameters. Further, it is desired that the alignment procedure does not require collimators to be paired together throughout all further handling and fabrication steps once they have been commonly aligned.

A further problem with the alignment procedures describe above is that they attempt to minimize insertion loss by favoring a small focused beam size and a collimated beam in the far field. However, for some applications such as an interference filter placed close to the output of the GRIN lens, a focused beam introduces excessive beam divergence (or non-parallelism), which compromises the effectiveness of an interference filter designed for perpendicular rays. The prior art techniques are not easily adapted for more complex beam optimization.

SUMMARY OF THE INVENTION

In the invention, a collimator assembly includes a fiber pig,tail and a lens, preferably a graded-index (GRIN) or similar type collimating lens. The components are preferably mounted inside a thin tube or sleeve, and are fixed relative to each other for optimized output. According to the invention, the beam profile output from the fiber and lens being mated is monitored. The fiber-lens separation is varied to produce a beam width within a predetermined range. The fiber and lens are fixed at the optimized separation. Preferably, the beam is monitored at a predetermined distance from the output of the lens.

In a preferred method, the GRIN lens is fixed to the tube, and a ferrule holding the fiber is inserted into the tube and positioned to be closely adjacent to the GRIN lens. The ferrule is then moved away from the GRIN lens until the beam size is measured to be within the predetermined or desired range.

In one embodiment of the invention, there are two separations between the fiber and lens at which the beam size is within the predetermined range. The smaller separation is chosen for a slightly converging beam (rather than a diverging beam).

The predetermined beam size and the predetermined measuring distance may further depend upon or result from an optimization technique which is dictated by and distinctive to the intended use of the collimator assembly.

DETAILED DESCRIPTION OF THE PREFERRED EMBODIMENTS

The invention allows the alignment of a collimator using only a variation along the axis of the tube holding the fiber by requiring the beam width at the optimized separation between the fiber and the collimating lens be within a predetermined range.

Figure 1:
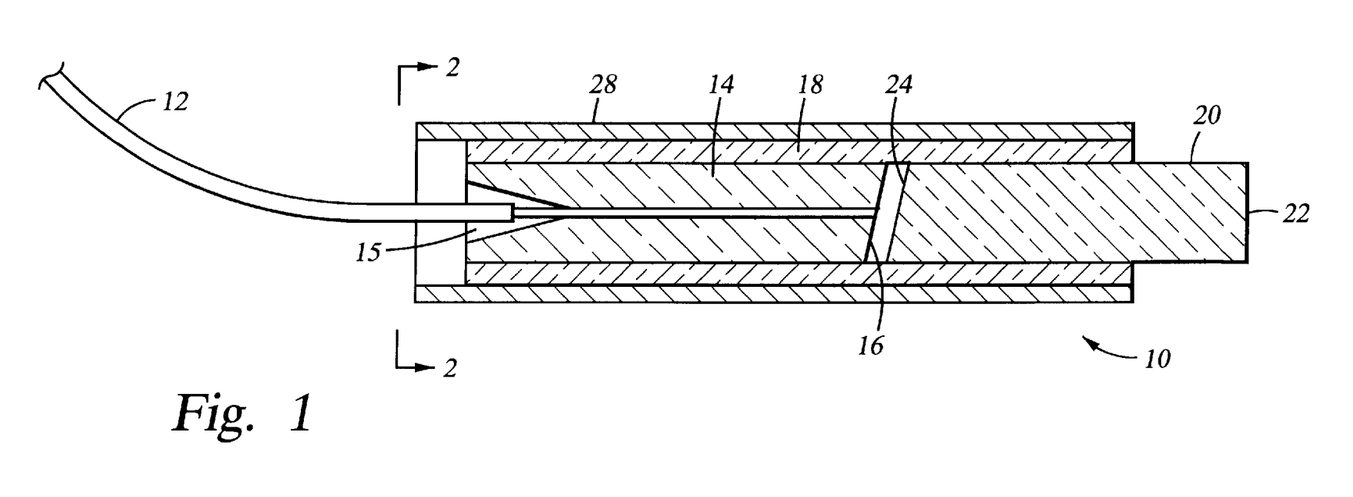
FIG. 1 is a cross-sectional side view of a dual collimator assembly fabricated and aligned according to the system and method of this invention.
Figure 2:
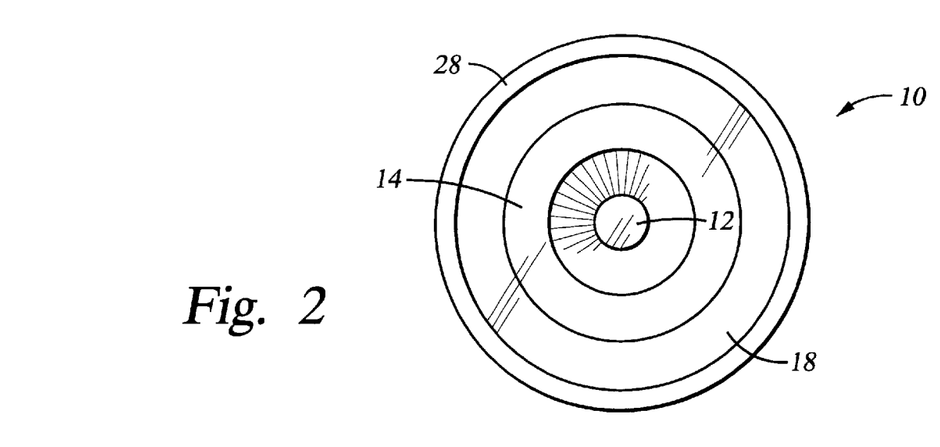
FIG. 2 is a cross-section axial view of the collimator of FIG. 1 taken along line 2—2 in FIG. 1.

A collimator 10 of one embodiment of the invention is illustrated in a side cross-sectional view in FIG. 1 and in an end view, partly in section, in FIG. 2. An optical fiber 12 is received within the central axial aperture of a glass ferrule 14. The fiber 12 typically includes a silica-based core and cladding, and a surrounding polymeric cover such as of an acrylate material. The polymeric cover is stripped from the fiber 12 in the portion received by the ferrule 14. For strength and thermal stability, the polymeric cover extends into a conical aperture 15 formed in the end of the ferrule 14 but does not touch the ferrule 14 itself. As a result, the ferrule 14 typically holds only the core and cladding of the fiber 12. Additional adhesive, as will be described later, and other stiffening members may be added to strengthen the joint with the fiber 12.

The end faces 16 of the ferrule 14 and fiber 12 are cleaved, ground, and polished at a predetermined facet angle (for example 8°) to prevent back reflection along the optical axis. The ferrule 14 fits snugly but easily slidably within the central bore of a glass tube 18 and is eventually bonded to it. A graded-index (GRIN) lens 20 also fits within the bore of the glass tube 18 and is bonded to it. A typical dimension of the bore of the tube 18 is about 1.8 mm with the outer diameters of the ferrule 14 and the GRIN lens 20 being several micrometers smaller to provide both good axial alignment and easy sliding between the two parts. As was explained before, the GRIN lens 20 is shaped like a rod and has an index of refraction varying along its radius so as to act like a convex lens. Preferably, the GRIN lens 20 has a plano end 22 facing the exterior of the collimator 10 and a faceted end 24 having similar slope and orientation as the inner end 16 of the ferrule 14. The separation or gap 26 between the ferrule inner end 16 and the inner faceted end 24 of the GRIN lens 20 is determined by the process of the invention. After the alignment, the glass tube 18 fits in and is bonded to a metal sleeve 28, for example, a gold-plated stainless-steel tube.

In the alignment of the collimator 10, the GRIN lens 20 is inserted into the closely fitting glass tube 18 with its faceted end 24 facing the interior of the tube 18, and the GRIN lens 20 is bonded to the tube 18 with, for example, cured epoxy. The ferrule 14 with attached fiber 12 is then movably inserted into the other end of the glass tube with the angled ferrule face 16 closely aligned azimuthally (about the tube axis) with the faceted face 24 of the GRIN lens 20. The ferrule 14 is pushed into the tube 18, preferably till it touches touches the GRIN lens 20. There is sufficient adhesion that the ferrule 14 remains within the glass tube 18 during movement.

In both the alignment and the installation of the aligned collimator, the slanted orientations of the two end faces 16, 24 should be aligned to each other and then possibly aligned with the optical system in which the collimator is being used. Accordingly, the glass tube 18 should be marked at an azimuthal angle corresponding to one extreme of the faceted face of the grin lens 20, and the ground ferrule should be similarly marked with the matching extreme of its faceted face 16. These marks are used to azimuthally align the two parts.

Figure 3:
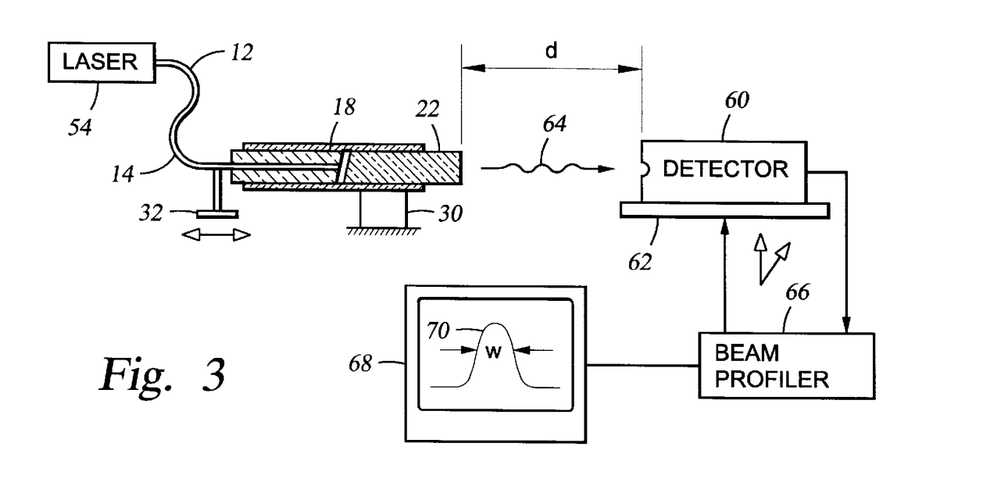
FIG. 3 is a schematic diagram of an exemplary embodiment of the alignment equipment used in practicing the present invention.

The glass tube 18 is attached to a stationary fixture 30, illustrated schematically in FIG. 3, with the azimuthal alignment marks set in a predetermined direction, preferably up. However, the fiber 12 is fixed to a one-dimensional stage 32 providing motion for it and the ferrule 14 along the z-axis, that is, along the direction of the cylindrical axis of the glass tube 18 and the optical axis of the grasped fiber 12.

Figure 4:
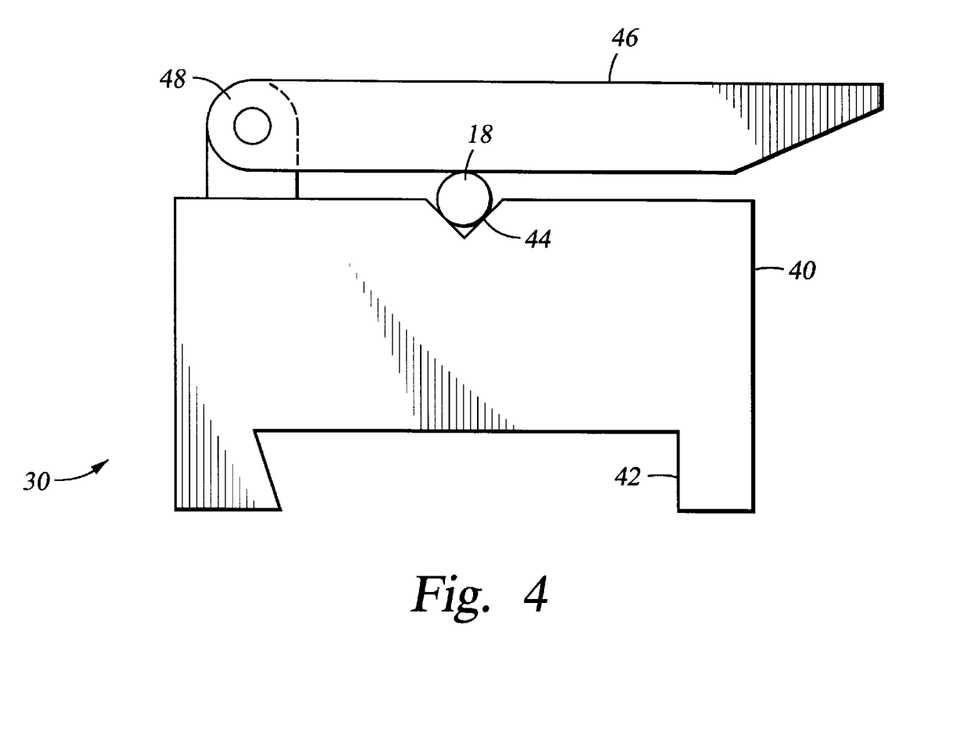
FIGS. 4 and 5 are detailed end views of two clamps used in the alignment equipment of FIG. 3.
Figure 5:
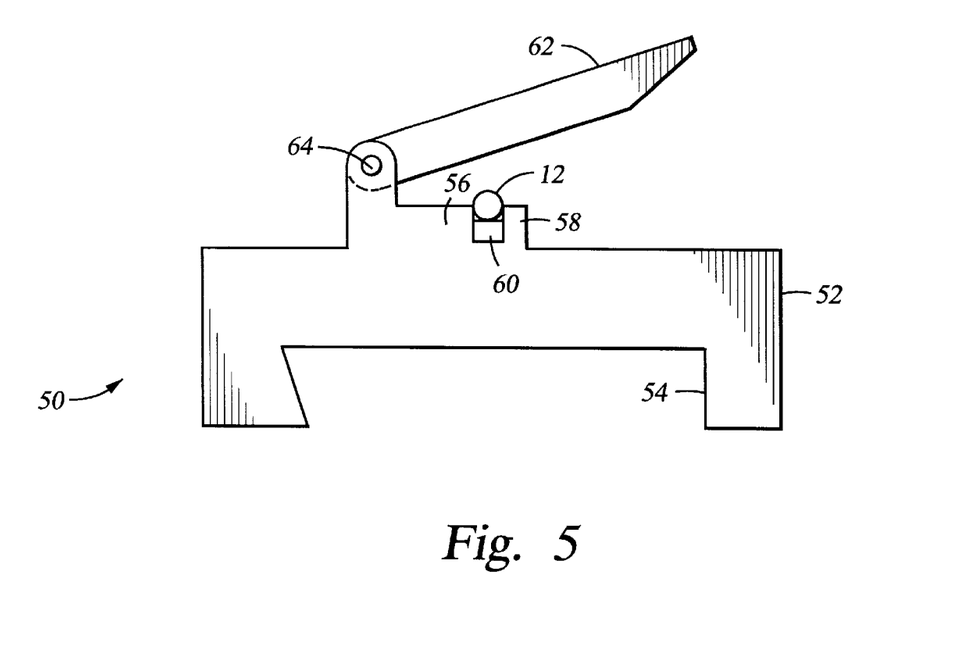

A manually closable clamp fixture 30 is illustrated in end view in FIG. 4. A block 40 has on its bottom a faceted groove 42 for engaging an optical slide and has on its upper side a V-shaped groove 44, into which is placed the glass tube 18, which has been bonded to the GRIN lens 22 and into which the ferrule 14 and attached fiber 12 have been loosely inserted. An arm 46 pivoting from a spring-loaded hinge 48 is gently released to engage and hold the glass tube 18. The movable fixture 32 of FIG. 3 includes a clamp 50 illustrated in end view in FIG. 5. It includes a block 52 extending axially for a few centimeters with a faceted groove 54 on its bottom for engagement with an optical slide. On it top, it includes two gate house structures on each axial end with two turrets 56, 58 for laterally constraining the thin, flexible fiber 12. An elastic tape 60 is attached to the top of the block 52 generally along the path between the two gate house structures. When the glass tube 18 is clamped in the stationary fixture, the fiber 12 with its protective polymeric coating is led between the turrets 56, 58 of the two gate house structures to rest on the resilient tape 60. A wide lever arm 62 loosely pivoting on a hinge 64 is gently lowered onto the fiber 12. A mag,net in the lever arm 62 and another magnet in the clamp block 52 may be used to provide the minimal holding force required for the block 52 to draw the fiber 12 and attached ferrule 14 out from the glass tube 18. In practice, the stationary fixture 30 is mounted on an x-y stage adjusted during initial beam alignment but thereafter fixed in place, while the illustrated movable fixture 32 is slid along an unillustrated optical slide by an unillustrated vernier screw engaging a box gear in the movable clamp 50.

A laser 54, as shown in FIG. 3, or other light source is attached to the pigtail of the fiber 12, preferably emitting within the optical bandwidth in which the fiber is single-mode, for example, a laser diode emitting at 1550 nm.

An optical detector 60 mounted on a two-dimensional stage 62 is positioned at a predetermined distance d from the plano side 22 of the GRIN lens 20. An example of this distance is 55±2 mm. The stage 62 provides motion along the x- and y-axes, that is, along the two orthogonal axes orthogonal to the z-axis of the glass tube 18. A visible laser plumb line may be used to initially align the x-y stage 42 with the fixed support 30 and the laterally movable base of the movable fixture 32 so that the center point of the beam 64 from the collimator may be established in the x- and y-coordinates of the stage 62. The stages 30, 32, and 62 used in the optical system of FIG. 3 need to be carefully aligned so that their respective axes are coincident with the same set of orthogonal directions. Standard optical equipment carefully installed on an optical table will usually be adequate.

While it is possible to perform the beam profiling manually, it is desirable to use a computerized beam profiling system 66 such as the Melles Griot BeamAlyzer, which uses other optical methods than the x-y stage 62 to automatically profile the beam 64 in two transverse dimensions. The x-y stage 62 continues to be used i or initial beam alignment of the optical receiver for the beam profiling system 66. The beam profiling system 66 can display on a CRT screen 68 one or more beam profiles 70 having an experimentally determined beam width w. Typically, the width of such a profile is measured as the full-width at $1/e^2$ (13%), and its value is numerically displayed as well.

Once the tube and fiber are fixed to their stages with the ferrule butting the GRIN lens, the collimator is aligned by gradually moving the stage 32 holding the fiber 12 backwards, away from the GRIN lens 22 until the beam size, as determined by the beam profiler 66 with the detector 40 positioned a distance d from the GRIN lens 22, is within a predetermined range around a beam size w, for example, of 460±5 $\mu$m. Typically, there are two such positions, separated by an intermediate range exhibiting smaller beam sizes. The first one encountered is the preferred position and usually corresponds to a slightly diverging beam. The second position usually corresponds to a diverging beam. The values of d and w are determined from optical modeling of the preferred beam characteristics in the intended use of the collimator. The modeling typically trades off insertion loss between two collimators, which is usually closely related to focusing, with beam divergence, which is usually inversely related to beam size. In the case of the interference filter, excessive beam divergence degrades the performance of the filter. A narrow beam generally gives the lowest insertion loss, but any variation from the optimum alignment introduces severe loss. A very wide beam is very stable, and provides best performance of many optical elements, but the insertion loss is too great. A medium beam size is a compromise. Further, it is usually preferred that the beam be aligned to be slightly convergent, which is why the first encountered beam size w is the preferred one. It is alternatively possible to establish the desired beam size by empirical optimization.

Figure 6:
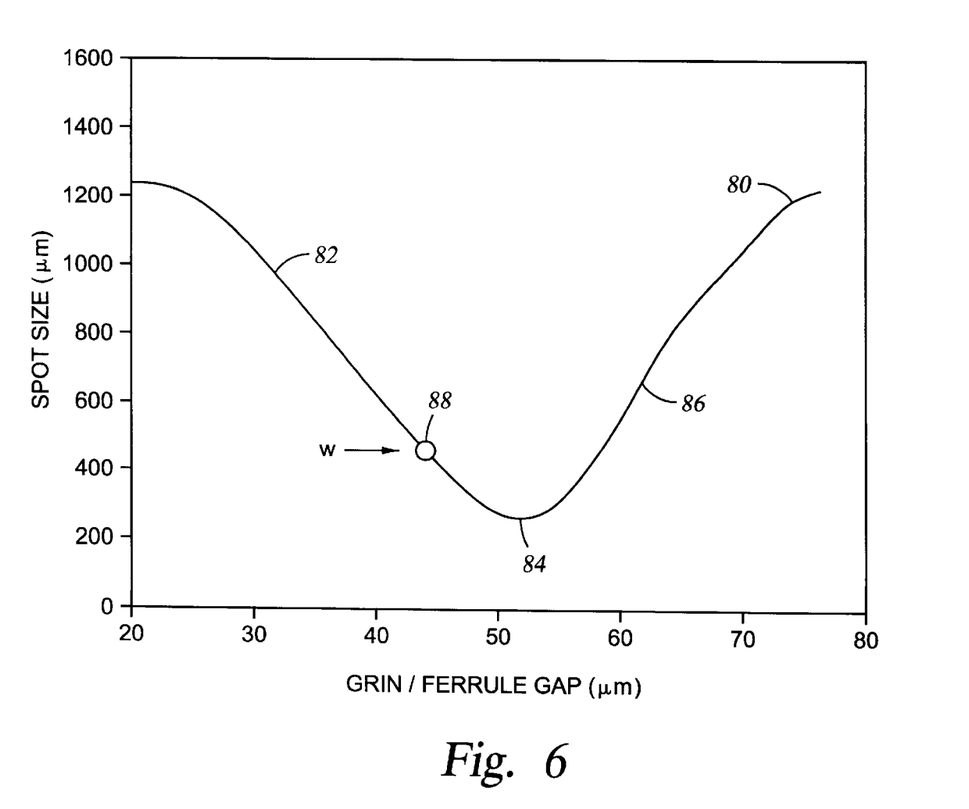
FIG. 6 is a graph illustrating the dependence of the spot size on the separation between the ferrule and the GRIN lens.

To illustrate this point, the equipment of FIG. 3 was used to measure beam sizes at the fixed distance d as a function of the gap between the ferrule 14 and the GRIN lens 22. The results are displayed as curve 80 in FIG. 6. As the ferrule 14 is drawn away from the GRIN lens 22, the beam size decreases in a descending section 82 until a minimum value 84 is encountered. Further separation increases the beam size in an ascending section 86. The minimum 84 corresponds to the focused or nearly collimated condition of the beam. In the descending section 82, the beam is (convergent; in the ascending section 86, the beam is divergent. A target value 88 for the beam size w is chosen in the convergent section 82. The beam-size target 88 of 460 µm is about 50% larger than the minimum spot size. Other paired values of d and w could be chosen based on the same optical modeling. The ranges for these parameters are chosen to extend from the central values by about ±4% for the distance d and ±1% for the beam size w.

In practice, an operator may manually adjust the stage 32 to gradually draw the ferrule 14 and fiber 12 away from the GRIN lens 20. The operator monitors the display screen 68 and halts the withdrawing when the beam size w is within the predetermined range. Of course, there may be some final fine adjustment to attain the central value of the range. The operator should, at least at the end, measure the beam size in the orthogonal direction to determine if the beam is elliptically shaped. If the ellipticity is excessive, the operator should check the equipment and particularly the alignment marks for the facet orientations of the ferrule 14 and GRIN lens 20.

It is of course appreciated that significant portions of the alignment procedure can be automated. Measuring the beam at a relatively small separation from the output of the collimator reduces the offset of the beam from a central axis caused by azimuthal misalignments of the facets of the ferrule 14 and GRIN lens 20. The reduced offset is more easily accommodated within automated procedures.

When the ferrule/GRIN separation has been optimized, the ferrule 14 is bonded to the tube 18, for example, by applying a small drop of UV curing epoxy to the exposed joint between the ferrule 14 and glass tube 18 while they are both held in their clamps 30, 50 at the optimized separation and then shining a UV lamp at the assembly to tack in the alignment.

The tacked collimator is removed from the clamps 30, 50, and a small amount of thermally curing epoxy is preferably injected from a syringe and placed around the ferrule/tube joint after the collimator has been heated. The collimator is then further heated so that the epoxy is wicked into entire interface between the ferrule 14 and the glass tube 18 and the epoxy is cured. The metal sleeve 28 is slid over the glass tube 18 with a small amount of glue put between the two cylindrical members. The metal sleeve 28 should be marked with a azimuthal alignment mark indicating the facet orientations of the GRIN lens 22 and ferrule 14. The reservoir at the fiber side of the sleeve 28 including the conical hole 15 is filled with an adhesive to relieve strain on the fiber 12. Additional members may be added for further strain relief.

The final product is an aligned collimator. Importantly, the so aligned collimator is a universal collimator that may be paired with any other so aligned collimator, particularly when the azimuthal alignment marks of the two collimators are aligned to each other. Although the collimators aligned with a master collimator can also be so mixed, the alignment procedure afforded by the present invention is much easier.

A variation on this method includes moving the tube along while the ferrule/fiber assembly is fixed until the predetermined beam spot size is observed but the distance d is not fixed. Also, it is possible but less convenient to initially fix the ferrule/fiber assembly in the tube and then move either the tube or the GRIN lens to achieve the desired beam spot size.

Figure 7:
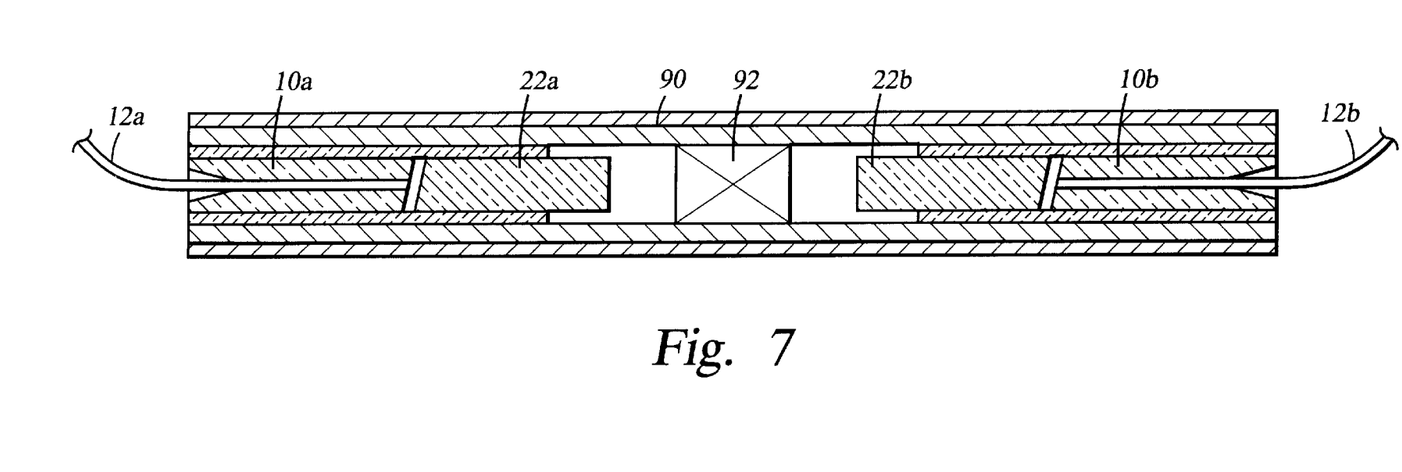
FIG. 7 is a cross-sectional side view of an exemplary two-port optical system incorporating the collimators aligned and fabricated using the method of this invention.

The one-fiber collimators aligned and assembled according to the invention can be used for both ports in a two-port system, such as the one schematically illustrated in cross section in FIG. 7. Two one-fiber collimators 10a, 10b such as ones aligned and assembled as previously described, are inserted into opposing ends of a closely fitting metal sleeve 90 with their GRIN lenses 22a, 22b facing each other and with their azimuthal alignment marks lined up. An optical element 92 is disposed between the GRIN lenses 22a, 22b. If it is an interference filter, it may be desired to place it closely adjacent to the GRIN lens 22a on the input side. In general, however, the form, function, and placement of the optical element 92 depend upon the application. It may be the previously described narrow-pass interference filter or optical isolator, but other types including diffraction gratings and actively controlled elements are possible. The two collimators 10a, 10b and the optical element 92 are bonded or otherwise fixed to the sleeve 90, which provides both support and alignment along an optical axis generally coincident with the center of the sleeve 90. The two optical fibers 12a, 12b act as the two ports of the optical system.

Figure 8:
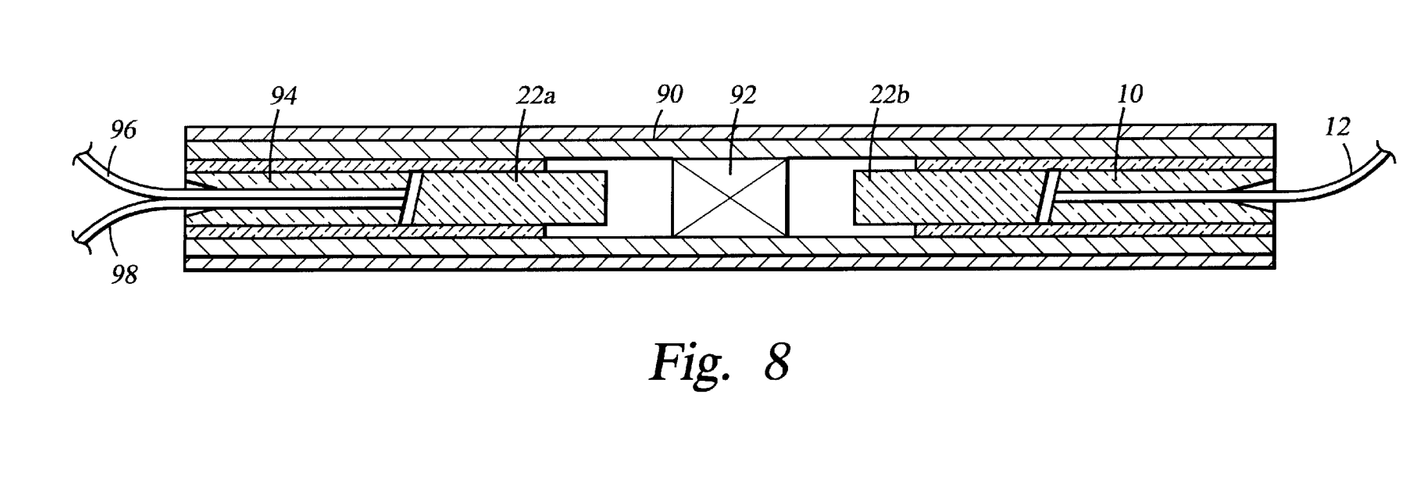
FIG. 8 is a cross-sectional side view of an exemplary three-port optical system incorporating the collimators aligned and fabricated using the method of this invention.

A similarly constructed three-port system is illustrated in the cross-sectional view of FIG. 8. The one-fiber collimator 10 is inserted and bonded on one end of the sleeve 90, and a two-fiber collimator 94 is inserted and bonded on the other end. The two-fiber collimator 94 is similar to the one-fiber collimator 10 but with a major difference that it includes two fibers 96, 98 that may be separated outside the collimator 94 but are laid very closely and in parallel to each other at least near the faceted end of the ferrule. When the optical element 92 is an interference filter, multi-wavelength light may be input on one paired fiber 96. Light reflected from the: interference filter is received by the other paired fiber 98 while light passed by the interference filter is transmitted to the single fiber 12.

Although the process of the invention was described only for one-fiber collimators, many of its features may be applied to two-fiber collimators.

A large number of one-fiber collimators were aligned and assembled as described above. Sixteen pairs of the collimators were randomly selected, and the insertion loss was measured as light was passed from one collimator to the other with no intervening optical element. The distribution of insertion losses in increments of 0.01 dB is tabulated in TABLE 1.

TABLE 1

| Insertion Loss (dB) | Number |
|---|---|
| 0.14 | 1 |
| 0.15 | 1 |
| 0.16 | 0 |

TABLE 1-continued

| Insertion Loss (dB) | Number |
|---|---|
| 0.17 | 3 |
| 0.18 | 2 |
| 0.19 | 2 |
| 0.20 | 4 |
| 0.21 | 2 |
| 0.22 | 1 |
| 0.23 | 0 |
| 0.24 | 0 |
| 0.25 | 1 |

These values show a low insertion loss comparable to that experienced in collimators assembled with more difficulty according to the prior art. Equally importantly, they show a distribution that is near to being a normal distribution expected from random statistics. Such a distribution is desirable because the probability of out lyers, that is, those products exhibiting performance badly out of specification, care be calculated statistically and the out lyers do not form a large part of the population and do not arise from a larger though less frequent misalignment effect.

The invention thus allows the efficient alignment of collimators. The invention provides for the alignment of collimators that do need not be paired to maintain the desired alignment and performance. The invention also can be performed with relatively simple equipment. In particular, no tilt-angle goniometer; are required.

Although the invention has been described in terms of certain optical fibers, cylindrical ferrules, tubes, GRIN lenses, sleeves, materials, fixtures, and bonding or soldering techniques, it is appreciated that other existing and hereafter-developed elements and techniques can be advantageously used with the present invention as dictated by the intended use of the collimator assemblies, various design and measurement parameters, cost or automation constraints, and the preferences and design considerations known to those skilled in the art of designing and fabricating such collimators and the optical components employing such collimators. In particular, the present invention may be employed with collimators having a graded-index (GRIN) lens, spherical or "ball" lens, drum lens, or an optical fiber lens., and with a variety of passive or active optical elements which may be described as interference filters, dichroic filters, thin-film filters, isolators, circulators, gain-flattening filters, narrow-band filters, wide-band filters, passband filters, band-stripping filters, grating elements, reflective elements, refractive elements, diffractive elements, or liquid-crystal elements, to specifically name a few of the available options.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. A collimator alignment system for assembling a fiber, a collimating lens, and a holder, the fiber having a first end and a second end and an optical axis, the holder having a longitudinal axis, the collimator alignment system comprising:

a first fixture capable of holding the first end of the fiber in relation to the holder;

a second fixture capable of holding the collimating lens relative to the holder;

a stage on which at least one of the first fixture or the second fixture is mounted so as to be movable in a direction generally parallel with the optical axis of the fiber such that the displacement between the fiber and the collimating lens may be adjusted;

a source emitting light into the second end of the fiber, the light being transmitted through the collimating lens; and a beam profiler including an optical detector receiving the light transmitted through the collimating lens for determining a beam size in at least one direction generally perpendicular to the optical axis of the fiber.

2. The collimator alignment system of claim 1 wherein the fiber and the collimating lens are selectively moved relative to one another in response to the measurement of the beam size determined by the beam profiler.

3. The collimator alignment system of claim 1 wherein the beam profiler determines the beam size in two directions which are generally perpendicular to the optical axis of the fiber.

4. The collimator alignment system of claim 1 wherein the fiber is a single-mode optical fiber for transmitting light within an infrared band, and the source emits light within the infrared band.

5. The collimator alignment system of claim 1 wherein the displacement of the fiber relative to the collimating lens is automatically adjusted in response to an output signal from the beam profiler in order to optimize the alignment based upon one or more predetermined parameters before the position of both the fiber and the collimating lens are fixed relative to the holder.

6. The collimator alignment system of claim 1 further comprising:

a ferrule receiving and retaining the first end of the fiber, the ferrule initially being movable with the first end of the fiber relative to the holder.

7. A method for aligning a collimator having a holder, a lens, and a fiber, the holder having a first end and a second end and a longitudinal axis, the fiber having a first end and a second end, the method comprising the steps of:

disposing the lens relative the first end of the holder;

disposing the first end of the fiber relative to the second end of the holder;

transmitting light through the fiber and the lens;

measuring a beam size of the light transmitted through the lens;

moving either the fiber or the lens or both relative to one another along the longitudinal axis of the holder until the beam size being measured is within a predetermined range; and fixing the position of the fiber and the lens relative to one another to provide a displacement at which the beam size being measured is within the predetermined range.

8. The method of claim 7 wherein the lens is bonded to the holder prior to the step of moving either the fiber or the lens relative to one another, and wherein the step of fixing the position of the fiber and the lens relative to one another comprises:

bonding the fiber to the holder after the beam size has been measured to be within the predetermined range.

9. The method of claim 8 wherein the fiber is held within a ferrule, and wherein the step of bonding the fiber to the holder comprises:

bonding the ferrule to the holder.

10. The method of claim 8 wherein the step of bonding the fiber to the holder is performed automatically in response to the beam size being measured within the predetermined range.

11. The method of claim 7 wherein the fiber is held within a ferrule, and further wherein the step of moving either the fiber or the lens relative to one another includes moving the ferrule relative to the holder.

12. The method of claim 11 wherein force is applied to the fiber and thereby moves the ferrule.

13. The method of claim 7 wherein the beam size within the predetermined range corresponds to a converging beam.

14. The method of claim 7 wherein there are two distinct ranges of displacement between the fiber and the lens at which the beam size is within the predetermined range, and the step of moving either the fiber or the lens relative to one another until the beam size being measured is within a predetermined range further comprises the step of:
   selecting the smaller of the two distinct ranges of displacement between the fiber and the lens prior to the step of fixing the position of the fiber and the lens relative to one another.

15. The method of claim 7 wherein the beam size is measured at a predetermined distance from the lens.

16. The method of claim 7 wherein the fiber is moved to an initial position closely proximate to the lens, and further wherein the step of moving the fiber and the lens relative to one another comprises the step of:
   withdrawing the first end of the fiber away from the lens until the beam size is measured to be within the predetermined range.

17. The method of claim 7 wherein the light transmitted through the fiber and the lens has an optical axis, and further wherein the step of measuring the beam size comprises the steps of:
   measuring the beam size in a first direction generally transverse to the optical axis; and
   measuring the beam size in a second direction generally transverse to the optical axis and angularly offset from the first direction.

18. The method of claim 17 wherein the first direction and the second direction are oriented generally perpendicular to one another.

19. The method of claim 7 wherein the collimator includes a ferrule having a conical depression communicating with a bore, and the fiber includes a protective covering, and further wherein the method comprises the steps of:
   stripping the protective covering from the first end of the fiber; and
   inserting the first end of the fiber within the bore of the ferrule such that a portion of the protective covering is disposed within the conical depression, but the protective covering is not in contact with the ferrule.

20. The method of claim 7 wherein the holder is a glass tube and the collimator includes a ferrule, and wherein the method further comprises the step of:
   providing a metal housing; and
   inserting the glass tube within the metal housing such that at least a portion of the ferrule is disposed inside the metal housing.

21. The method of claim 7 wherein the light transmitted through the fiber and the lens and used to measure the beam size is within an infrared portion rather than a visible portion of the light spectrum.

22. The method of claim 7 wherein the step of moving the fiber and the lens relative to one another during the step of measuring the beam size and prior to the step of fixing the position of the fiber and the lens relative to one another includes; no movement other than altering the displacement longitudinally between the fiber and the lens.

23. The method of claim 7 wherein the lens is a collimating lens.

24. The method of claim of 23 wherein the collimating lens is a graded-index (GRIN) lens.

25. The method of claim 7 wherein the fiber is a single-mode optical fiber.

26. A method for assembling an optical component comprising the steps of:
   providing a first collimator assembly and a second collimator assembly, each of the first collimator assembly and the second collimator assembly including a holder, a lens, and a fiber, the fiber and the lens being aligned by disposing the lens and the fiber relative the holder and one another, transmitting light through the fiber and the lens, measuring a beam size of the light transmitted through the lens, moving either the fiber or the lens or both relative to one another until the beam size being measured is within a predetermined range, and fixing the position of the fiber and the lens relative to one another to provide a misplacement at which the beam size being measured is within the predetermined range;
   providing a housing having opposing ends;
   providing an optical element;
   inserting the first collimator assembly, the second collimator, and the optical element within the housing such that the optical element is disposed between the first collimator assembly and the second collimator assembly, the lens of each of the first collimator assembly and the second collimator assembly being disposed in confronting relation to the optical element, the fiber of each of the first collimator assembly and the second collimator assembly extending from the opposing ends of the housing; and
   fixing the first collimator assembly, the second collimator assembly, and the optical element within the housing.

27. The method of claim 26 wherein the lens of each of the first collimator assembly and the second collimator assembly has an angled face confronting the fiber which defines an orientation therefore, and wherein the method further comprises the steps of:
   marking an alignment indicia on both the first collimator assembly and the second collimator assembly corresponding to the orientation respectively defined by the angled face of the lens thereof; and
   generally aligning the alignment indicia of the first collimator assembly relative to the alignment indicia of the second collimator assembly when received within the housing and fixed in position relative thereto.

28. The method of claim 27 wherein the alignment indicia corresponds to an azimuthal orientation of the angled face of the lens.

29. The method of claim 27 wherein the angled face of the lens of each of the first collimator assembly and the second collimator assembly are oriented generally parallel with one another when the alignment indicia are correspondingly aligned.

30. The method of claim 26 wherein the optical element is attached directly to the housing rather than to either the first collimator assembly or the second collimator assembly.

31. The method of claim 26 wherein the optical element is selected from a group consisting of an interference filter, a dichroic filter, a thin-film filter, an isolator, a circulator, a gain-flattening filter, a narrow-band filter, a wide-band filter, a passband filter, a band-stripping filter, a grating element, a reflective element, a refractive element, a diffractive element, a liquid-crystal element, or an active optical element.

32. The method of claim 26 wherein the lens of each of the first collimator assembly and the second collimator assembly are selected from the group consisting of a graded-index (GRIN) lens, a ball lens, a drum lens, or an optical fiber lens.

* * * * *